(12) United States Patent
Yamasaki et al.

(10) Patent No.: US 11,292,071 B2
(45) Date of Patent: Apr. 5, 2022

(54) METHOD FOR PRODUCING MOLDED ARTICLE, PRODUCTION DEVICE, AND MOLDED ARTICLE

(71) Applicant: KOBE STEEL, LTD., Hyogo (JP)

(72) Inventors: Takemasa Yamasaki, Hyogo (JP); Tatsuya Fujii, Hyogo (JP); Shinji Sato, Hyogo (JP); Takeshi Yamada, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 133 days.

(21) Appl. No.: 16/760,862

(22) PCT Filed: Oct. 30, 2018

(86) PCT No.: PCT/JP2018/040414
§ 371 (c)(1),
(2) Date: Apr. 30, 2020

(87) PCT Pub. No.: WO2019/098021
PCT Pub. Date: May 23, 2019

(65) Prior Publication Data
US 2021/0178502 A1    Jun. 17, 2021

(30) Foreign Application Priority Data

Nov. 15, 2017  (JP) ............................. JP2017-220214
Jul. 26, 2018  (JP) ............................. JP2018-140711

(51) Int. Cl.
*B23K 9/032* (2006.01)
*B23K 9/04* (2006.01)
(Continued)

(52) U.S. Cl.
CPC ............... *B23K 9/032* (2013.01); *B23K 9/04* (2013.01); *B33Y 10/00* (2014.12); *B33Y 30/00* (2014.12); *B33Y 80/00* (2014.12)

(58) Field of Classification Search
CPC ......... B33Y 80/00; B33Y 30/00; B33Y 10/00; B23K 26/342; B23K 10/027;
(Continued)

(56) References Cited

U.S. PATENT DOCUMENTS 4,237,361 A   12/1980 Zwintscher et al.
5,622,216 A *  4/1997 Brown .................. B22D 11/00
                                              164/71.1
(Continued)

FOREIGN PATENT DOCUMENTS

CN   105880808 A   8/2016
CN   106944715 A   7/2017
(Continued)

OTHER PUBLICATIONS

The extended European search report issued by the European Patent Office dated Jul. 30, 2021, which corresponds to European Patent Application No. 18879712.0-1016 and is related to U.S. Appl. No. 16/760,862.

*Primary Examiner* — Jacob J Cigna
(74) *Attorney, Agent, or Firm* — Studebaker & Brackett PC

(57) ABSTRACT

A method for producing a built-up object by melting and solidifying a filler metal to form weld beads on a base surface along a track for a torch and form the built-up object formed by the weld beads is provided. The built-up object includes a bead formation portion where a gravitational influence is maximum. The method includes: forming a supporting bead having a higher viscosity during weld-bead formation than other weld beads in the bead formation portion; and forming the other weld beads overlying the supporting bead.

10 Claims, 12 Drawing Sheets

(51) Int. Cl.
   *B33Y 30/00*  (2015.01)
   *B33Y 80/00*  (2015.01)
   *B33Y 10/00*  (2015.01)

(58) Field of Classification Search
   CPC ...... B23K 10/006; B23K 9/044; B23K 9/042; B23K 9/04; B23K 9/032
   See application file for complete search history.

(56) References Cited

U.S. PATENT DOCUMENTS

| | | | | |
|---|---|---|---|---|
| 5,633,021 | A * | 5/1997 | Brown | B29C 64/40 |
| | | | | 425/375 |
| 5,852,272 | A * | 12/1998 | Amano | E02F 9/2883 |
| | | | | 219/76.14 |
| 5,932,059 | A * | 8/1999 | Langer | B33Y 10/00 |
| | | | | 156/275.5 |
| 6,574,523 | B1 * | 6/2003 | Hanna | B29C 64/135 |
| | | | | 700/120 |
| 7,829,000 | B2 * | 11/2010 | Farr | B33Y 50/02 |
| | | | | 264/113 |
| 10,279,541 | B2 | 5/2019 | Tomuta | B33Y 80/00 |
| 10,315,252 | B2 * | 6/2019 | Symeonidis | B23K 15/0086 |
| 10,821,633 | B1 * | 11/2020 | Quinonez | B29C 64/118 |
| 2006/0192315 | A1 * | 8/2006 | Farr | B33Y 10/00 |
| | | | | 264/113 |
| 2014/0197576 | A1 * | 7/2014 | Kraibuhler | B33Y 30/00 |
| | | | | 264/308 |
| 2015/0224607 | A1 * | 8/2015 | Bruck | B23K 25/005 |
| | | | | 219/73.21 |
| 2016/0009026 | A1 * | 1/2016 | Kraibuhler | B29C 64/393 |
| | | | | 264/40.7 |
| 2016/0067740 | A1 * | 3/2016 | Voris | B29C 64/118 |
| | | | | 427/402 |
| 2016/0375635 | A1 * | 12/2016 | Tomuta | B33Y 80/00 |
| | | | | 264/255 |
| 2017/0232679 | A1 * | 8/2017 | Gardiner | B29C 64/209 |
| | | | | 425/162 |
| 2017/0369731 | A1 * | 12/2017 | Lisitsin | B33Y 70/00 |
| 2018/0178314 | A1 * | 6/2018 | Maccormack | B33Y 10/00 |
| 2019/0255765 | A1 * | 8/2019 | Takeyama | B29C 64/118 |
| 2020/0391316 | A1 * | 12/2020 | Yamasaki | B22F 12/226 |
| 2021/0094113 | A1 * | 4/2021 | Sakai | B22F 12/37 |
| 2021/0187855 | A1 * | 6/2021 | Cardon | B29C 64/118 |

FOREIGN PATENT DOCUMENTS

| | | |
|---|---|---|
| EP | 0 529 816 A1 | 3/1993 |
| JP | 2003266174 A * | 9/2003 |
| JP | 2003266174 A | 9/2003 |
| JP | 2015-160217 A | 9/2015 |
| JP | 2016-196012 A | 11/2016 |

* cited by examiner (b)

(a)

(b)

(a)

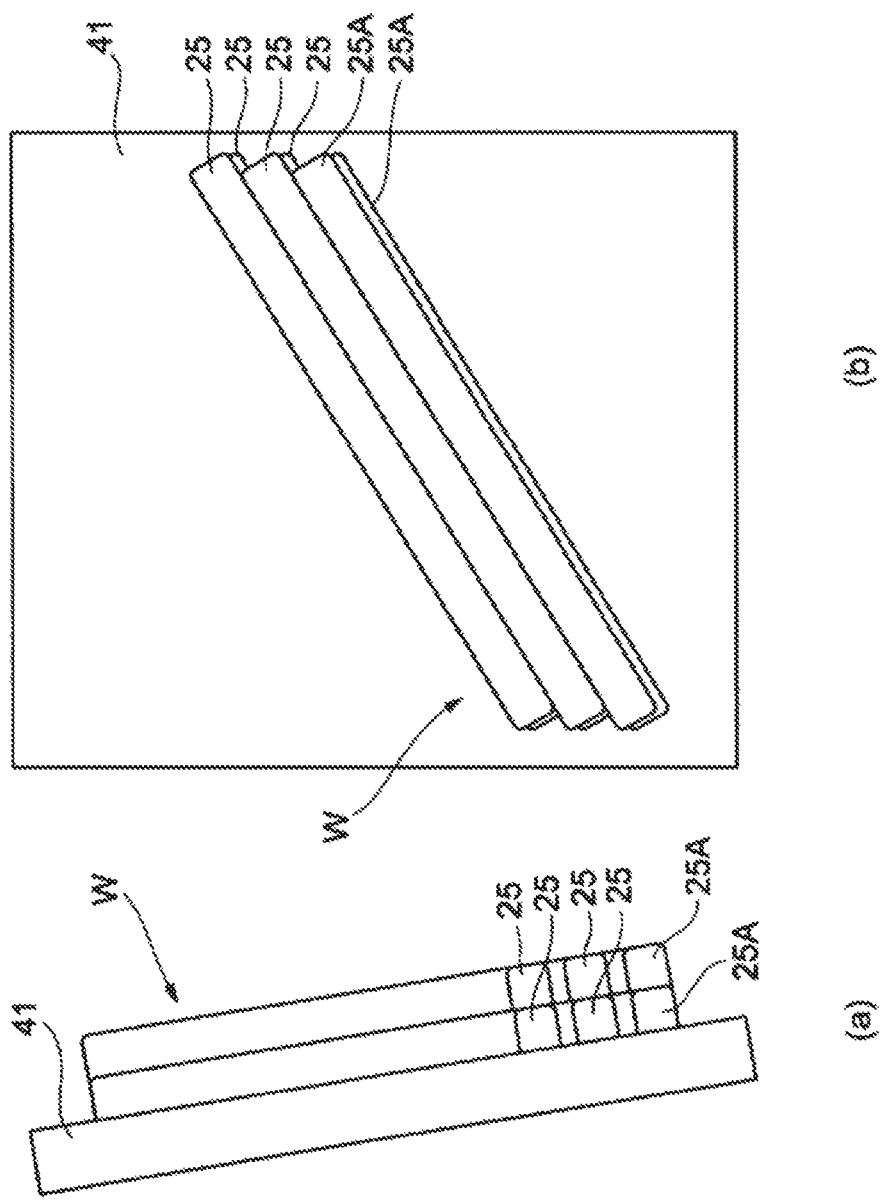

US 11,292,071 B2

METHOD FOR PRODUCING MOLDED ARTICLE, PRODUCTION DEVICE, AND MOLDED ARTICLE

TECHNICAL FIELD

The present invention relates to a method for producing a built-up object, a production apparatus, and a built-up object.

BACKGROUND ART

In recent years, there is growing need for 3D printers as production means, and researches and developments have been made in the field of airplanes, etc. in order to practically apply 3D printers to, in particular, metallic materials. For example, a 3D printer employing a metallic material melts the metal powder or metal wire using a heat source such as a laser or an arc, and deposits the molten metal, thereby producing a built-up object.

As a technique for producing such a built-up object, there is a common technique including a torch scanning step in which a torch is moved in a scanning manner along a horizontal plane or an inclined plane to perform overlay welding, thereby producing a three-dimensional shaped object (see, for example, Patent Literature 1).

CITATION LIST

Patent Literature

Patent Literature 1: JP-A-2003-266174

SUMMARY OF INVENTION

Technical Problem

Meanwhile, in a case of forming a weld bead on a base surface of either a substrate or lower-layer weld beads and the base surface being inclined, there is a possibility that dripping might occur due to the influence of gravity. In a case where the travelling speed of the welding torch is heightened in order to avoid the dripping of the weld bead, there is a possibility that humping in which the weld bead breaks might occur. There is hence a desire for a technique for producing a built-up object by smoothly forming weld beads without being influenced by the state of the base surface on which the weld beads are being formed and without arousing any trouble such as dripping or humping.

An object of the present invention is to provide a method and an apparatus for producing a built-up object which are capable of producing a built-up object by efficiently forming weld beads without arousing any trouble such as dripping or humping and to provide a built-up object.

Solution to Problem

The present invention includes the following configurations.

(1) A method for producing a built-up object by melting and solidifying a filler metal to form weld beads on a base surface along a track for a torch and form the built-up object formed by the weld beads, in which the built-up object includes a bead formation portion where a gravitational influence is maximum, in which the method includes: forming a supporting bead having a higher viscosity during weld-bead formation than other weld beads in the bead formation portion; and forming the other weld beads overlying the supporting head.

(2) An apparatus for producing a built-up object by melting and solidifying a filler metal to form weld beads and form the built-up object including the weld beads on a base surface, the apparatus including: a torch configured to form the weld beads; a moving mechanism configured to move the torch relatively to the base surface; and a control unit, in which the built-up object includes a bead formation portion where a gravitational influence is maximum, in which the control unit is configured to control the moving mechanism and the torch such that a supporting bead having a higher viscosity during weld-bead formation than other weld beads is formed in the bead formation portion and the other weld beads are formed so as to overlie the supporting bead.

(3) A built-up object including a plurality of deposited weld beads formed by melting and solidifying a filler metal, the built-up object including: a bead formation portion where a gravitational influence is maximum; a supporting bead formed in the bead formation portion having a higher viscosity during weld-bead formation than other weld beads; and the other weld beads formed so as to overlie the supporting bead.

Advantageous Effects of Invention

In the present invention, a built-up object can be produced by efficiently forming weld beads without arousing any trouble such as dripping or humping.

Figure 4:
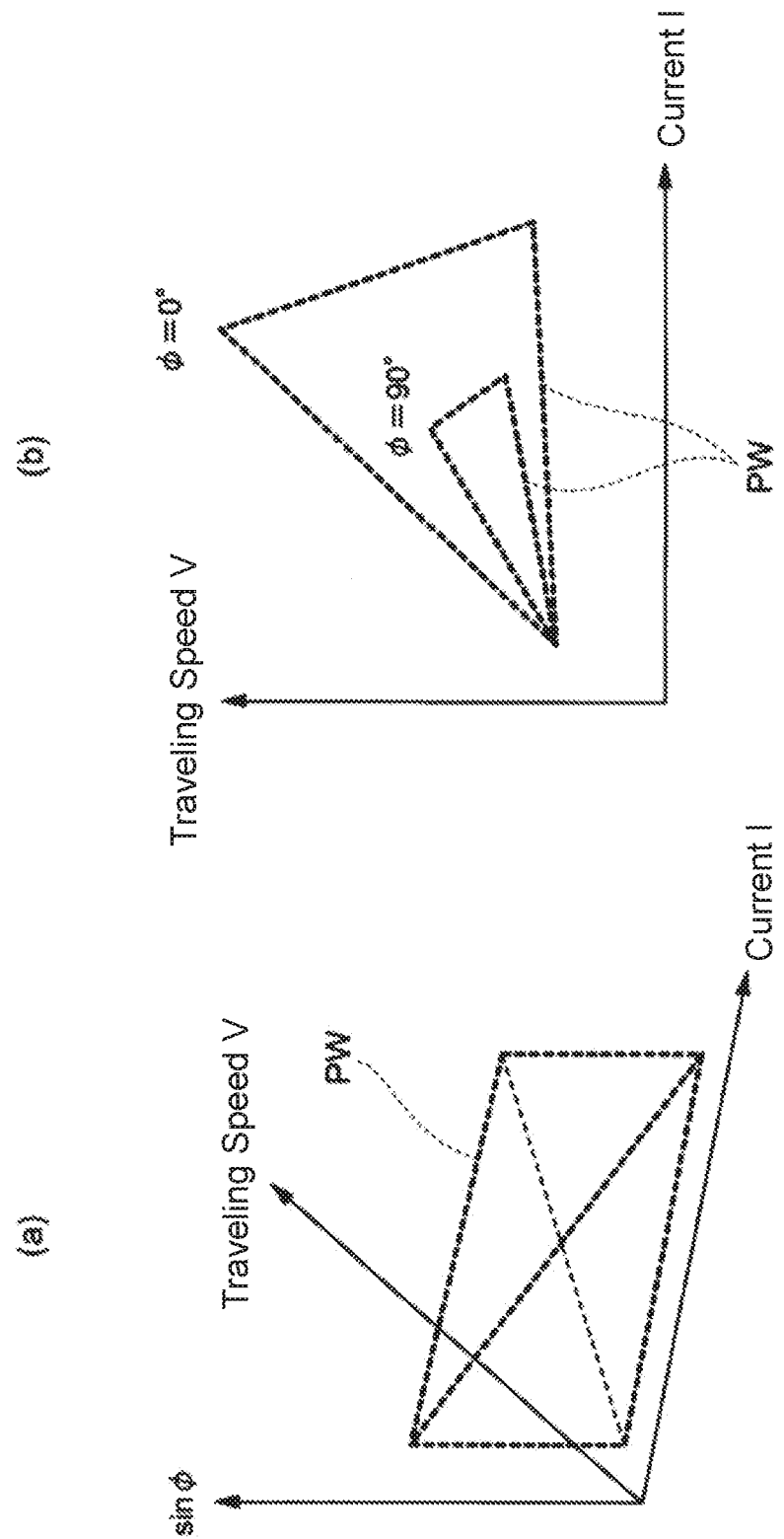

(a) and (b) of FIG. 4 are each a chart illustrating a process window to be used in forming a weld bead.

Figure 5A:
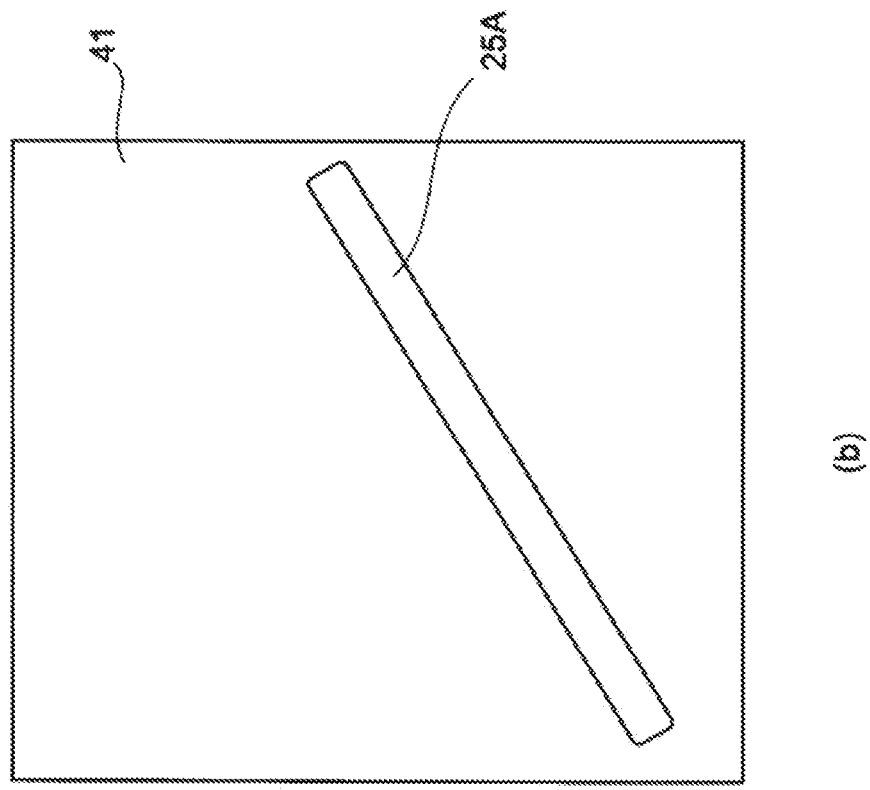
Figure 5A:
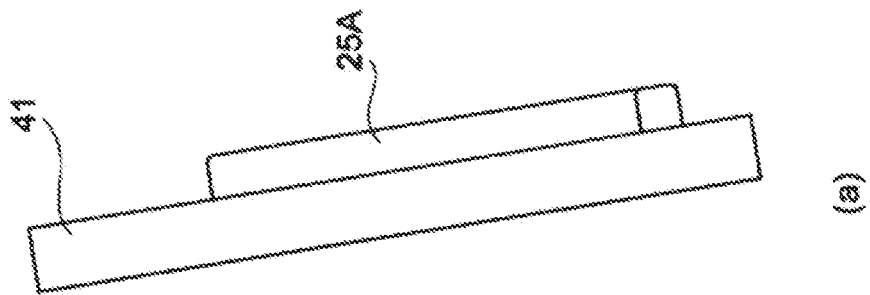

FIG. 5A is views illustrating a deposition procedure for depositing a first layer of a built-up object being formed on a base plate; (a) is a side view and (b) is a front view.

Figure 5B:
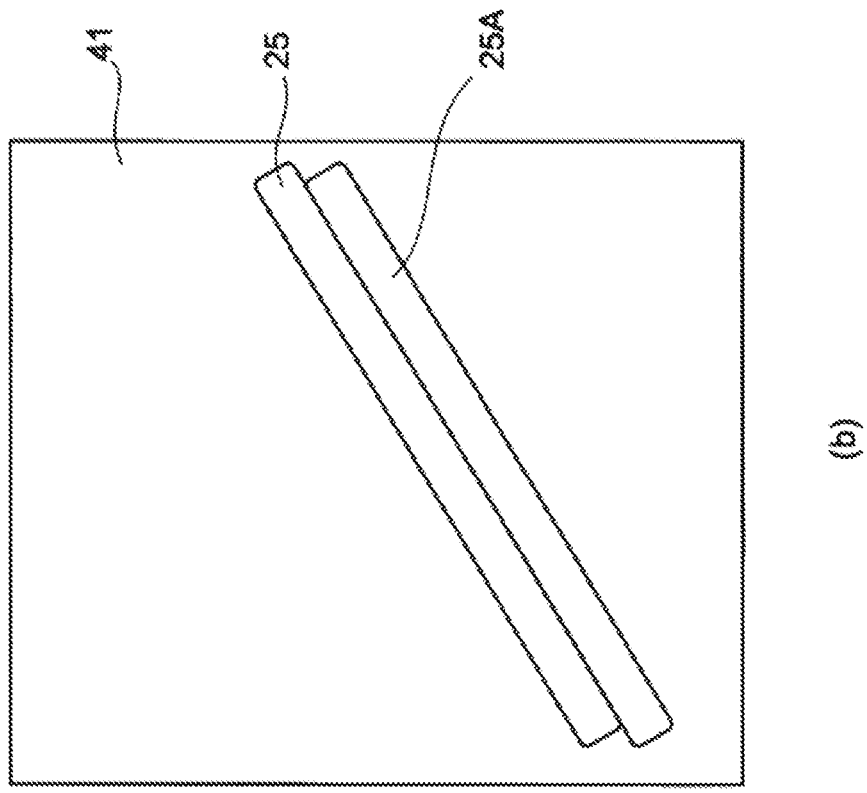
Figure 5B:
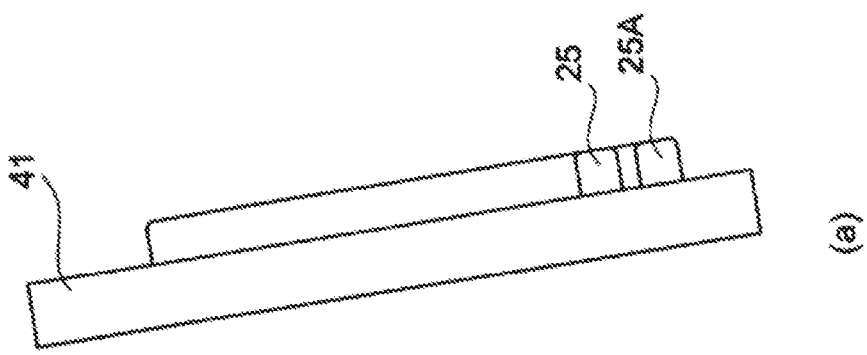

FIG. 5B is views illustrating the deposition procedure for depositing the first layer of the built-up object being formed on the base plate; (a) is a side view and (b) is a front view.

Figure 5C:
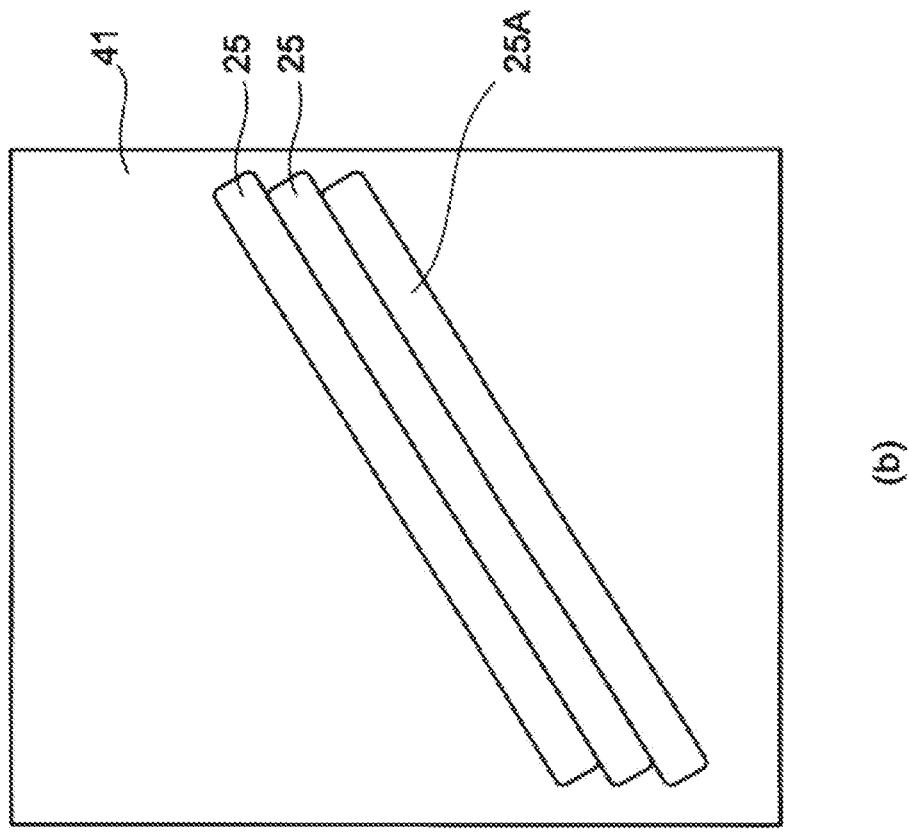
Figure 5C:
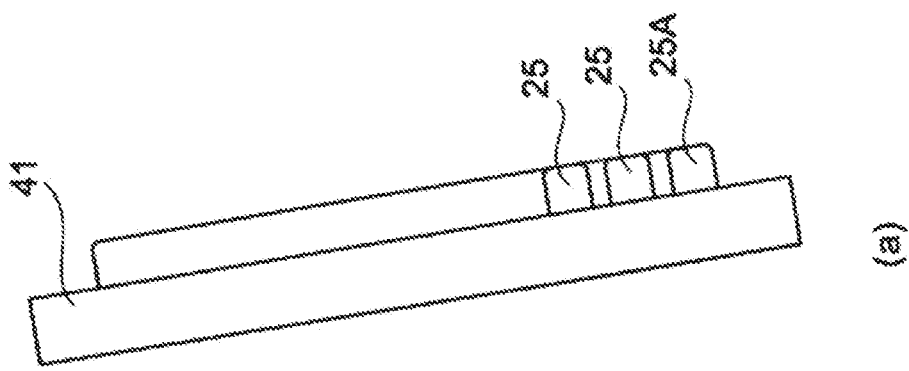

FIG. 5C is views illustrating the deposition procedure for depositing the first layer of the built-up object being formed on the base plate; (a) is a side view and (b) is a front view.

Figure 6A:
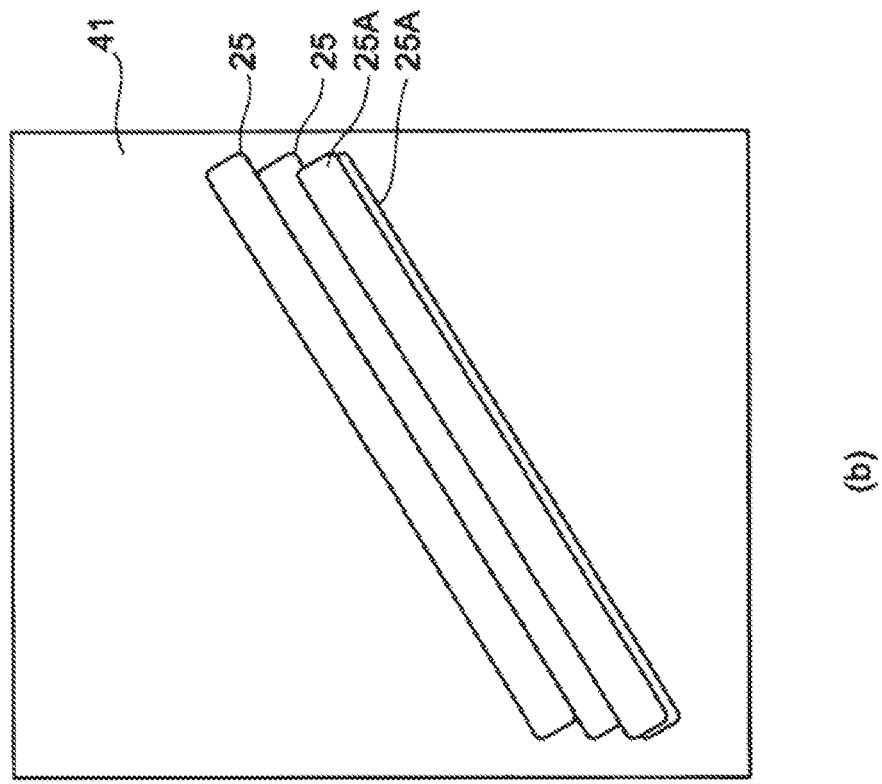
Figure 6A:
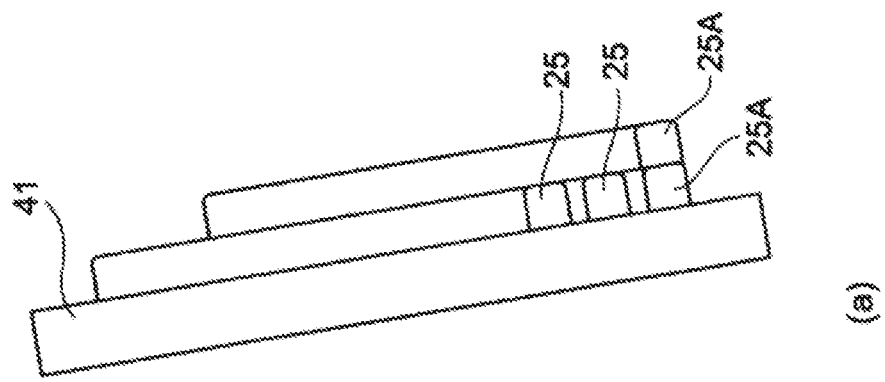

FIG. 6A is views illustrating a deposition procedure for depositing a second layer of the built-up object being formed on the base plate; (a) is a side view and (b) is a front view.

Figure 6B:
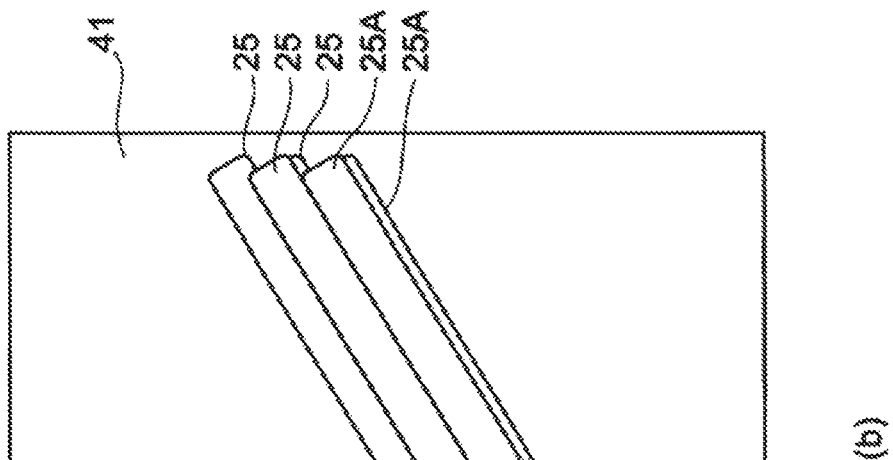
Figure 6B:
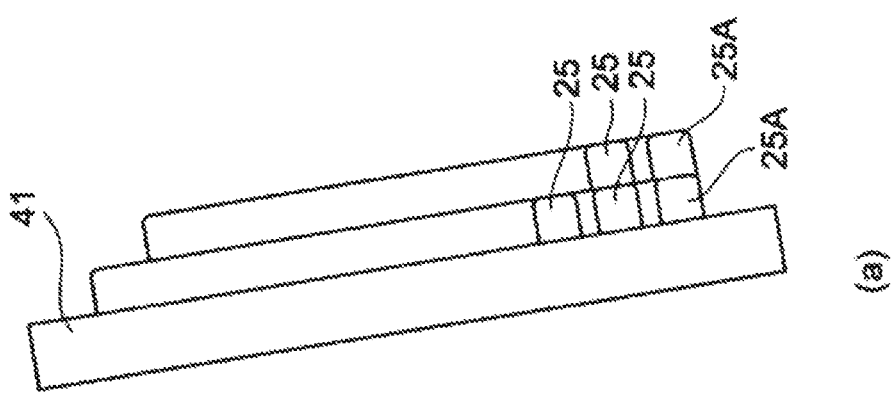

FIG. 6B is views illustrating the deposition procedure for depositing the second layer of the built-up object being formed on the base plate; (a) is a side view and (b) is a front view.

FIG. 6C is views illustrating the deposition procedure for depositing the second layer of the built-up object being formed on the base plate; (a) is a side view and (b) is a front view.

Figure 7:
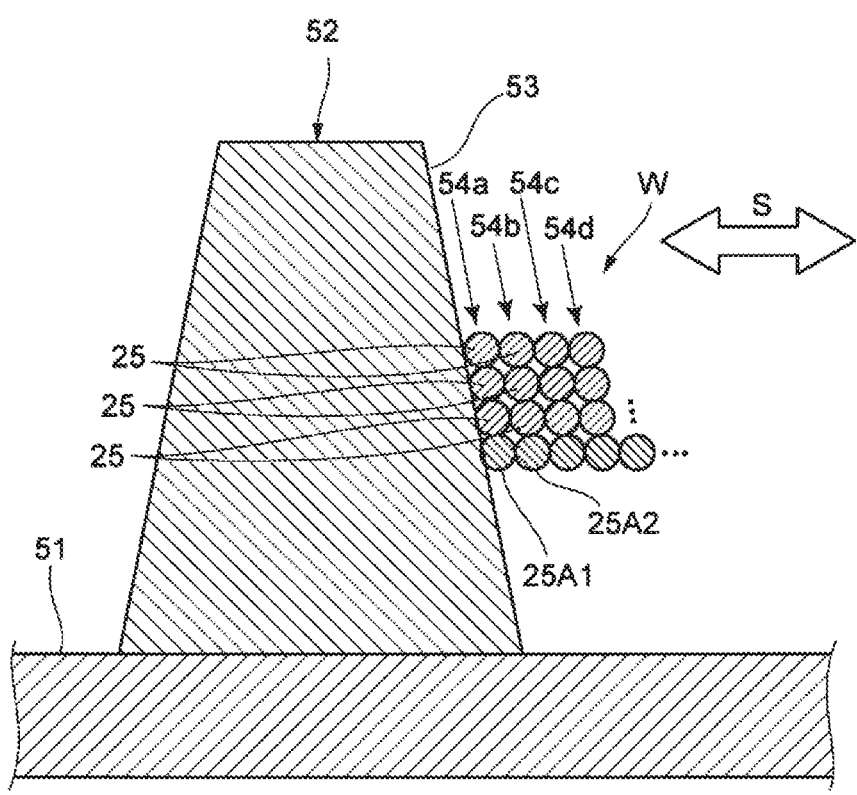

FIG. 7 is a diagrammatic vertical cross-sectional view of a built-up object, the view illustrating a built-up object production example.

DESCRIPTION OF EMBODIMENTS

Embodiments of the present invention are described below in detail by reference to the drawings.

Figure 1:
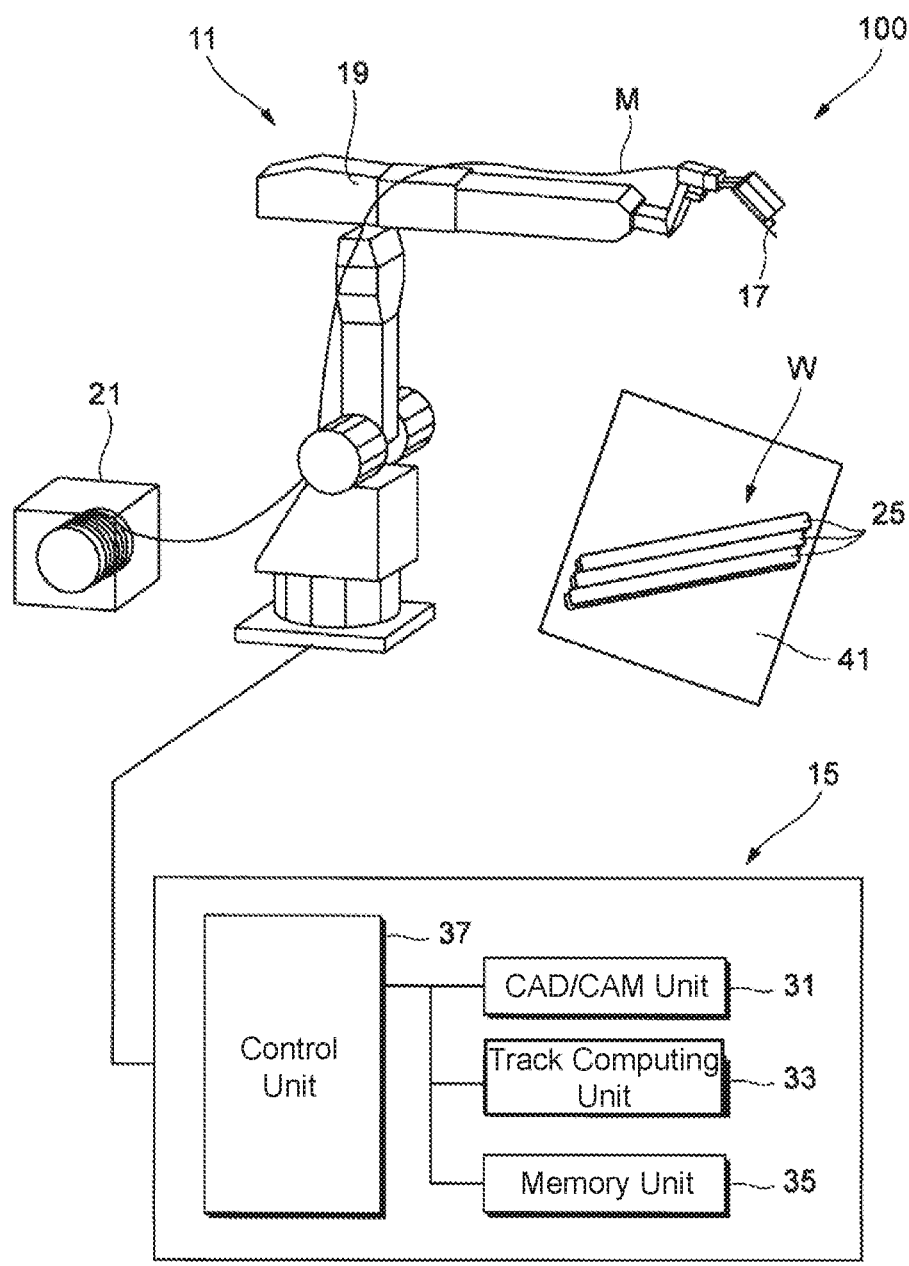
FIG. 1 is a schematic view illustrating the configuration of a production system for producing a built-up object of the present invention.

FIG. 1 is a schematic view illustrating the configuration of a production system for producing a built-up object of the present invention.

The production system 100 having this configuration includes: an additively manufacturing device 11; and a controller 15 configured to control the whole additively manufacturing device 11.

The additively manufacturing device 11 includes: a welding robot 19 having a torch 17 provided to an end shaft thereof; and a filler-metal feed part 23 configured to feed a filler metal (welding wire) M to the torch 17.

The controller 15 includes: a CAD/CAM unit 31; a track computing unit 33; a memory unit 35; and a control unit 37 to which these units have been connected.

The welding robot 19 is an articulated robot, and the filler metal M is supported by the torch 17 provided to the end shaft, such that the filler metal M can be continuously fed thereto. The position and posture of the torch 17 can be arbitrarily set three-dimensionally within the range over which the robot arm is movable.

The torch 17 includes a shield nozzle (not shown), and a shielding gas is supplied from the shield nozzle. Arc welding to be used in this configuration may be either a consumable-electrode method, such as shielded-metal arc welding or carbon dioxide gas arc welding, or a non-consumable-electrode method, such as TIG welding or plasma arc welding. An appropriate arc welding method is selected depending on the built-up object W to be produced.

For example, in the case of a consumable-electrode method, a contact tip is disposed inside the shield nozzle, and a filler metal M to which a melting current is supplied is held by the contact tip. The torch 17, while holding the filler metal M, generates an arc from the end of the filler metal M in a shielding gas atmosphere. The filler metal M is fed from the filler-metal feed part 23 to the torch 17 by a feeding mechanism (not shown) attached to the robot arm, or the like. The continuously fed filler metal M is melted and solidified while the torch 17 is moved, thereby forming a linear weld bead 25, which is a solid formed by melting and solidifying the filler metal M, on a base plate 41.

Heat sources for melting the filler metal M are not limited to the arc. For example, a method employing other heat source(s), such as a heating method in which an arc and a laser are used in combination, a heating method in which a plasma is used, or a heating method in which an electron beam or a laser is used, may be employed. In the case of heating with an electron beam or a laser, the quantity of applied heat can be more finely controlled to more properly maintain the state of the weld bead, thereby contributing to a further improvement in the quality of the additively-manufactured object.

The CAD/CAM unit 31 produces profile data on the built-up object W to be produced and then divides the profile data into data for each of a plurality of layers to produce layer profile data representing the profile of each layer. The track computing unit 33 determines a movement track for the torch 17 based on the produced layer profile data. The data, including the produced layer profile data and the movement track for the torch 17, are stored in the memory unit 35.

The control unit 37 executes a driving program based on the layer profile data and the movement track for the torch 17, which are stored in the memory unit 35, to operate the welding robot 19.

The control unit 37 executes a driving program based on the layer profile data and the movement track for the torch 17, which are stored in the memory unit 35, to operate the welding robot 19. That is, the welding robot 19, in accordance with a command from the controller 15, moves the torch 17 while melting the filler metal M with an arc, based on the movement track for the torch 17 produced by the track computing unit 33. FIG. 1 shows how a built-up object W is produced by obliquely disposing a plurality of weld beads 25 on a base plate 41 constituted of a steel plate inclined with respect to the vertical plane.

Figure 2A:
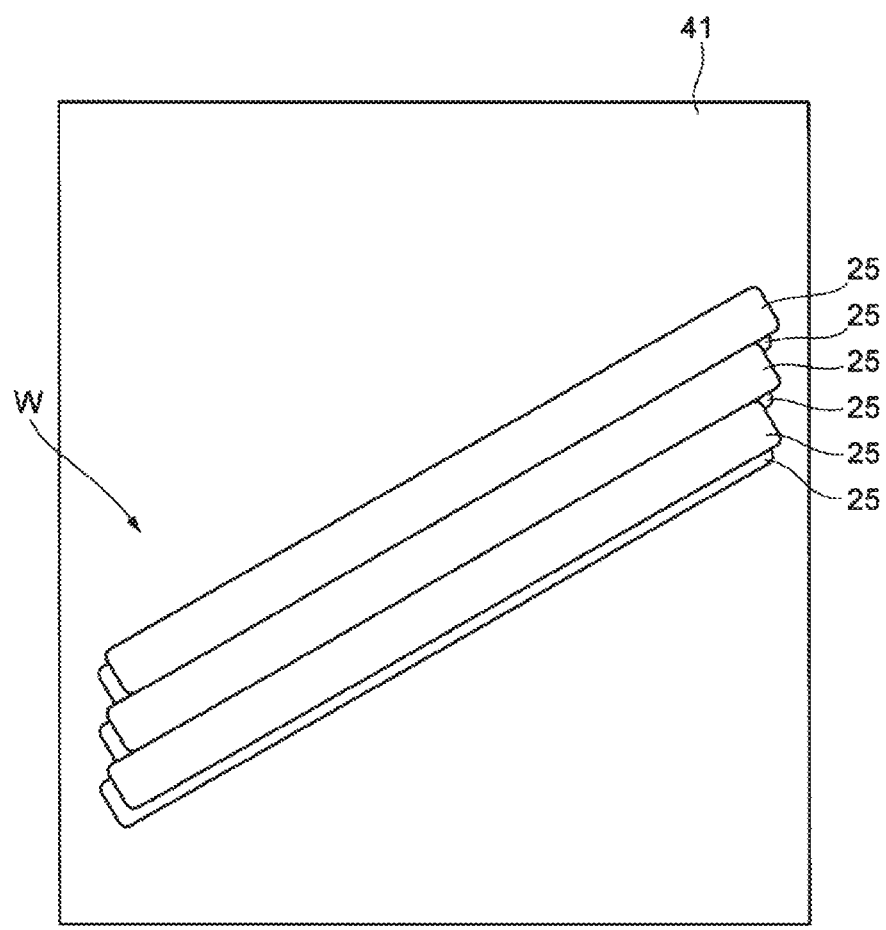
FIG. 2A is a front view of a built-up object produced by depositing weld beads.
Figure 2B:
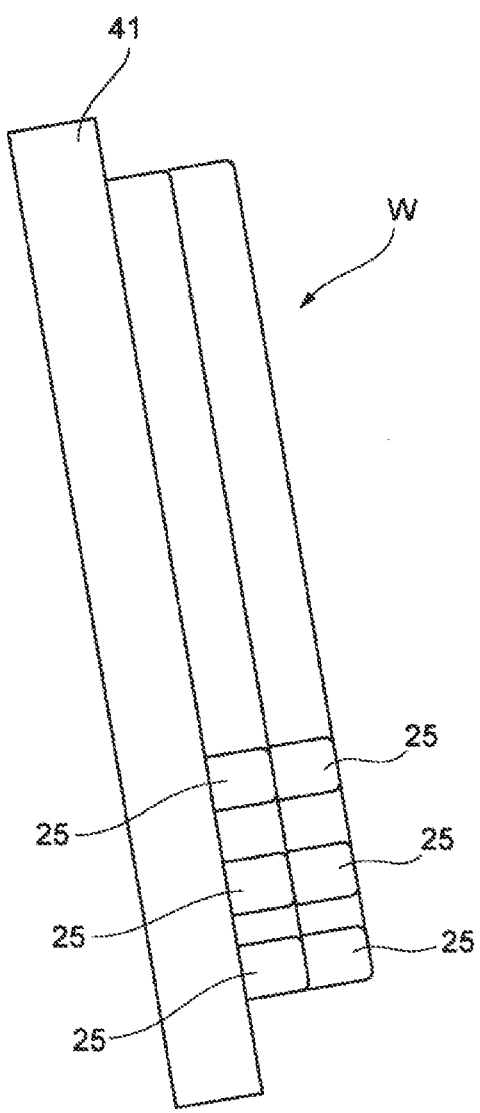
FIG. 2B is a side view of the built-up object produced by depositing weld beads.

The production system 100 having the configuration described above melts the filler metal M while moving the torch 17 by the welding robot 19 along the movement track for the torch 17 produced from the set layer profile data and feeds the molten filler metal M to the surface of the base plate 41. Thus, for example as illustrated in FIG. 2A and FIG. 2B, a plurality of linear weld beads 25 are formed and obliquely arranged on the base plate 41 inclined with respect to the vertical plane, thereby producing a built-up object W including a plurality of layers of the thus deposited weld beads.

Figure 3:
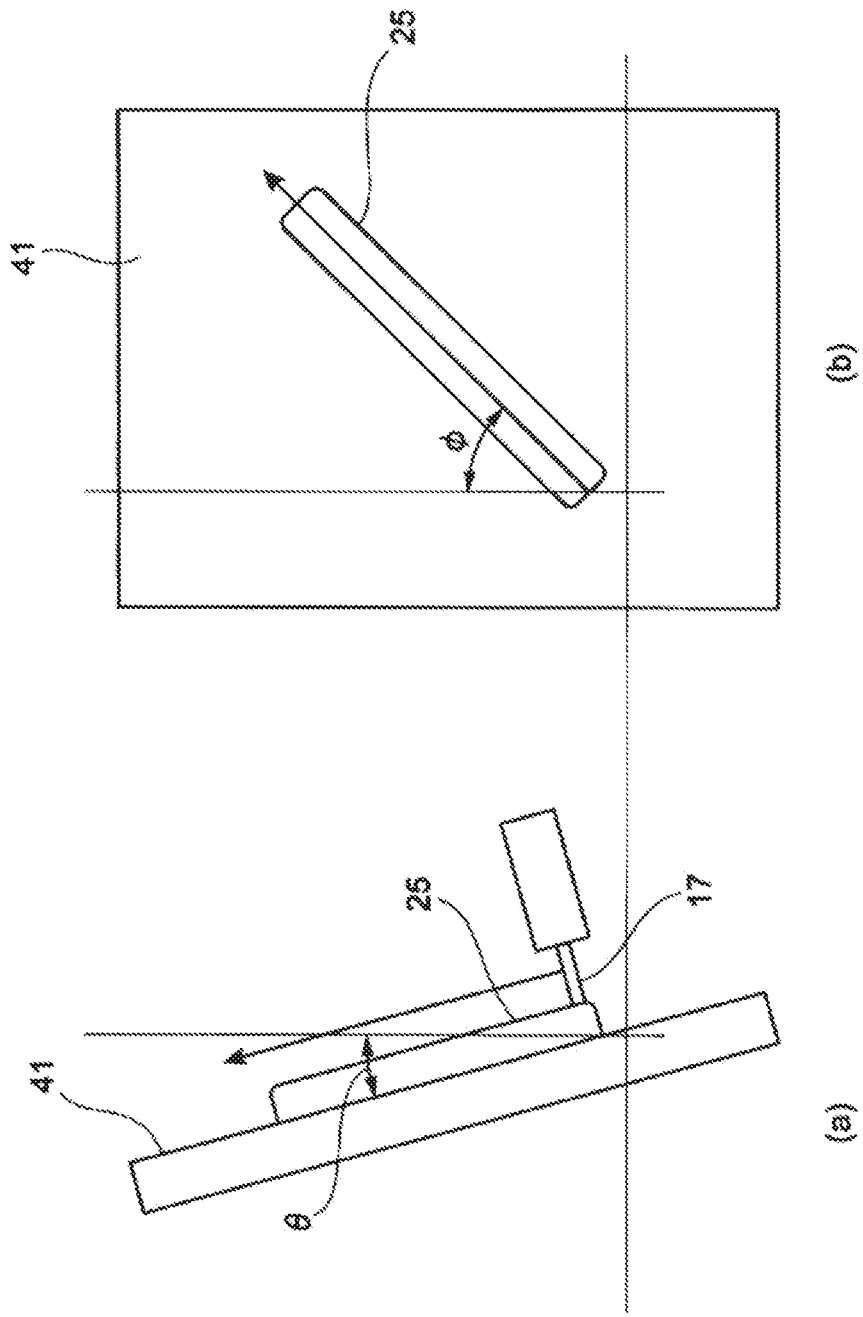
FIG. 3 is views for illustrating how a weld bead is formed; (a) is a side view and (b) is a front view.

Meanwhile, in a case where a torch 17 is moved obliquely to the vertical direction to form a weld bead 25 on a base plate 41 inclined with respect to the vertical plane as illustrated in (a) and (b) of FIG. 3, there is a possibility that the weld bead 25 being formed might drip due to the influence of gravity. This gravitational influence is greater as the angle (base-surface inclination angle) θ formed by the base surface, which is the surface of the base plate 41, and the vertical direction becomes smaller, and is greater as the angle (track inclination angle) φ formed by the track direction of the torch 17 and the vertical direction over the base plate 41 becomes larger. In a case where the weld bead 25 being formed thus undergoes a considerable gravitational influence, although the dripping can be inhibited by increasing the travelling speed V of the torch 17, humping in which the weld bead 25 breaks might occur.

Because of this, in this embodiment, a built-up object W is produced while dripping and humping in weld beads 25 are prevented in the manner described below. Here, the explanation is made for a case in which a base plate 41 inclined with respect to the vertical plane such that the base-surface inclination angle θ is less than 90° is used and weld beads 25 are formed on the base plate 41 along a track direction inclined with respect to the vertical direction at a track inclination angle φ, thereby producing a built-up object W including two deposited layers of weld beads 25. The built-up object W in this case has a bead formation portion where a gravitational influence is maximum.

(First Layer)

In a case of forming a plurality of weld beads 25 to produce a first layer of a built-up object W, a portion where a gravitational influence is maximum, in the portion where the plurality of weld beads 25 are to be formed, is determined first. In determining the portion where a gravitational influence is maximum, the base-surface inclination angle θ, which is the angle between the base plate 41 on which weld beads 25 are to be formed and the vertical plane, and the track inclination angle φ, which the angle between the track direction of the torch 17 for forming weld beads 25 and the vertical direction on the base plate 41, are used as indexes of gravitational influence to determine that portion. For example, $\cos\theta \sin\varphi$ is used for the determination.

In a case where a built-up object W is produced by forming weld beads 25 on a base plate 41 inclined at a base-surface inclination angle $\theta$ along a track direction inclined with respect to the vertical direction at a track inclination angle $\varphi$, a lower-end portion is the portion where a gravitational influence is maximum in the first layer.

After the portion where a gravitational influence is maximum in the portion where weld beads 25 are to be formed has been determined, a supporting bead 25A is formed as a weld bead 25 in this portion. This supporting bead 25A is a low-heat-input bead formed with a reduced heat input for melting the filler metal. Since this supporting bead 25A is a low-heat-input bead, the supporting bead 25A has higher molten-state viscosity during bead formation and is less affected by gravity than weld beads 25 to be deposited thereafter. That is, even when this supporting bead 25A is formed in the portion where a gravitational influence is maximum, dripping due to gravity is prevented.

In this example, in forming the supporting bead 25A, a travelling speed V and a current value I for arc generation of the torch 17 are determined, for example, from a process window PW, which indicates a set region, having been produced beforehand and stored in the memory unit 35.

(a) and (b) of FIG. 4 illustrate process windows PWs indicating the travelling speed V and the current value I for arc generation of the torch 17 in a case where a base plate 41 is disposed vertically such that a base-surface inclination angle $\theta$ is 0°. As illustrated in (a) and (b) of FIG. 4, the process windows PWs regarding travelling speed V and current value I gradually become narrower as the track inclination angle $\varphi$ increases, because the gravitational influence becomes greater. The control unit 37 determines a travelling steed V and a current value I for forming the supporting bead 25A, based on the process window PW stored in the memory unit 35.

After determining the travelling speed V and the current value I, the control unit 37 operates the welding robot 19 to form the supporting bead 25A at the determined travelling speed V and current value I in the lower-end portion, where a gravitational influence is maximum, along a movement track which has been produced, as illustrated in (a) and (b) of FIG. 5A. This supporting bead 25A, which is a low-heat-input bead, is high in viscosity during bead formation and can be less affected by gravity. Consequently, the supporting bead 25A, which is a low-heat-input bead, can be formed on the base plate 41 without dripping due to gravity even in the portion where the gravitational influence is maximum.

Thereafter, other weld beads 25 in the first layer are successively formed on the upper side of the already formed supporting bead 25A on the surface of the base plate 41. In forming these other weld beads 25, a weld bead 25 is first formed on the upper side of the already formed supporting bead 25A in a portion of the surface of the base plate 41 which adjoins the supporting bead 25A, as illustrated in (a) and (b) of FIG. 5B. As a result, the weld bead 25 formed so as to adjoin the already formed supporting bead 25A is supported by the already formed supporting bead 25A. Consequently, even when this weld bead 25 is a high-heat-input bead which has low viscosity during bead formation and can hence drip due to a gravitational influence, this weld bead 25 is supported by the supporting bead 25A and formed. Thus, dripping is inhibited in forming this weld bead 25. Furthermore, as illustrated in (a) and (b) of FIG. 5C, other weld beads 25 are successively formed on the upper side of the formed weld bead 25 so as to adjoin the formed weld bead 25. In this operation, since the weld beads 25 being formed are supported by the underlying weld bead 25 which has been formed, dripping is inhibited in forming these weld beads 25.

(Second Layer)

In a case where a plurality of weld beads 25 are formed on the first layer to form a second layer of the built-up object W, a portion where a gravitational influence is maximum in the second layer is determined. Since weld beads 25 are to be formed on the base plate 41 inclined at the base-surface inclination angle $\theta$ along the track direction inclined with respect to the vertical direction at the track inclination angle $\varphi$ to produce the built-up object W, a lower-end portion is the portion where a gravitational influence is maximum also in the second layer.

After the portion where a gravitational influence is maximum has been determined, a supporting bead 25A having a higher viscosity during bead formation than other weld beads to be deposited thereafter is formed as a weld bead 25 in the portion.

After determining a travelling speed V and a current value I for forming the supporting bead 25A, the control unit 37 operates the welding robot 19 to form the supporting bead 25A at the determined travelling speed V and current value I in the lower-end portion, where a gravitational influence is maximum, along a movement track which has been produced, as illustrated in (a) and (b) of FIG. 6A.

Thereafter, other weld beads 25 in the second layer are successively formed on the upper side of the already formed supporting bead 25A on the surface of the base plate 41. Also in this case, a weld bead 25 is formed on the upper side of the already formed supporting bead 25A in a portion of the surface of the base plate 41 which adjoins the supporting bead 25A, as illustrated in (a) and (b) of FIG. 6B. As a result, this weld bead 25 is supported by the already formed supporting bead 25A. Consequently, this weld bead 25, even when being a high-heat-input bead which has low viscosity during bead formation and can hence drip due to a gravitational influence, is formed while being supported by the supporting bead 25A. Thus, dripping is inhibited in forming this weld bead 25. Furthermore, as illustrated in (a) and (b) of FIG. 6C, other weld beads 25 are successively formed on the upper side of the formed weld bead 25 so as to adjoin the formed weld bead 25. In this operation, since the weld beads 25 being formed are supported by the underlying weld bead 25 which has been formed, dripping is inhibited in forming these weld beads 25.

As explained above, in this embodiment of the method and apparatus for built-up object production and the built-up object, a supporting bead 25A is formed in a portion where a gravitational influence is maximum and other weld beads 25 are formed so as to overlie the supporting bead 25A. Specifically, in a case where the base surface on which weld beads 25 are to be formed, which is either the surface of a base plate 41 or the upper surface of underlying-layer weld beads 25, is inclined, a supporting bead 25A is formed in a lower-end portion of each bead layer. Thus, other weld beads 25 can be formed using the formed supporting bead 25A as a support. Consequently, not only the other weld beads 25 can be inhibited from dripping by the gravitational influence but also it is possible to inhibit humping, which may occur if the travelling speed V of the torch 17 is increased in order to inhibit the dripping. Thus, a built-up object W of high quality can be produced while a takt time is reduced.

Furthermore, the low-heat-input beads formed with a reduced heat input for melting the filler metal M have a higher viscosity during bead formation and can be less affected by gravity than the other weld beads 25 to be deposited thereafter. Consequently, even in portions where the gravitational influence is maximum, supporting beads 25A constituted of such low-heat-input beads can be formed while dripping due to the gravitational influence is prevented.

Moreover, a portion where a gravitational influence is maximum can be determined from the base-surface inclination angle θ, which is the angle between the base surface being either the surface of the base plate 41 or the upper surface of underlying-layer weld beads and the vertical plane, and from the track inclination angle φ, which is the angle between the track direction of the torch 17 and a vertical direction on the base surface, and a supporting bead 25A can be accurately formed in the portion to produce a built-up object.

In particular, since indexes of gravitational influence are determined from cos θ sin φ, a built-up object W can be smoothly formed on the base surface having the base-surface inclination angle of θ and the track inclination angle of φ.

Next, a built-up object production example in this embodiment of the production method described above is explained.

FIG. 7 is a view illustrating an example of producing a built-up object.

As illustrated in FIG. 7, a built-up object W is being formed on a base 52 placed on a pedestal 51. The base 52 has a trapezoidal shape in the cross-section and the side surfaces thereof are inclined so as to face upward. Weld beads 25 are formed on a base surface 53 which is an inclined side surface of the base 52. A plurality of bead layers 54a, 54b, 54c, 54d, . . . each composed of weld beads 25 have been formed on the base surface 53 so as to be stacked in a lateral direction S. Specifically, the plurality of bead layers 54a, 54b, 54c, 54d, . . . have been deposited on the base 52 in the horizontal direction from the base surface 53.

In forming a built-up object W on the base surface 53 of the base 52, a supporting bead 25A1 is first formed on the base surface 53 in a lower-end portion where a gravitational influence is maximum, along the base surface 53 in the direction of track inclination angle φ (φ=0°). Other weld beads 25 are successively formed on the upper side of the supporting bead 2541 along the base surface 53 so as to be fixed by the supporting bead 25A1. Thus, a first bead layer 54a is formed on the base surface 53.

In a case of forming a second and succeeding bead layer 54b, a supporting bead 25A2 is formed on the first bead layer 54a on the base surface 53 in a lower-end portion where a gravitational influence is maximum, along the base surface 53 (so as to be bonded to the first bead layer 54a) in the direction of track inclination angle φ (φ≠0°). Other weld beads 25 are successively formed on the upper side of the supporting bead 25A2 along the base surface 53 (so as to be bonded to the first bead layer 54a) so as to be fixed by the supporting bead 25A2.

In this production example, supporting beads 25A1, 25A2, . . . are formed in lower-end portions of the bead layers 54a, 54b, 54c, 54d, . . . where a gravitational influence is maximum, and other weld beads 25 are formed along the base surface 53 so as to be fixed by the supporting beads 25A1, 25A2, . . . . Thus, the weld beads 25 are supported by the supporting beads 25A1, 25A2, . . . even in a case where the weld beads 25 are deposited in an oblique direction (direction of track inclination angle φ) to which dripping is likely to occur. It is hence possible to prevent bead dripping and humping.

In particular, since the formation of the supporting beads 25A1, 25A2, . . . makes it possible to stably form the bead layers 54a, 54b, 54c, 54d, . . . , bead layers 54 each composed of weld beads 25 can be stacked in a lateral direction S on the side surface of the base 52 having an inclined base surface 53. That is, the production method in this embodiment is suitable for deposition on a base 52 placed on a pedestal 51 and having an inclined side surface being base surface 53, in which bead layers 54a, 54b, 54c, 54d, . . . composed of supporting beads 25A1, 25A2, . . . and of other weld beads 25 are formed on the base surface 53 being the side surface so as to be stacked in a lateral direction S.

The present invention is not limited to the embodiments described above, and the combination of configurations of the embodiments with each other or the modification or application by a person skilled in the art based on the statements in the description and common techniques are also expected in the present invention and are included in the claimed range.

For example, although the additively manufacturing device 11 having this configuration employs a welding robot 19 as the moving mechanism, the moving mechanism is not limited thereto and may have any configuration capable of moving the torch 17 relatively to the base plate 41. In this case, the term "track for the torch 17" means a track of a relative movement of the torch 17 with respect to the base plate 41.

As described above, the following matters are disclosed in this description.

(1) A method for producing a built-up object by melting and solidifying a filler metal to form weld beads on a base surface along a track for a torch and form the built-up object formed by the weld beads, in which the built-up object includes a bead formation portion where a gravitational influence is maximum, in which the method includes: forming a supporting bead having a higher viscosity during weld-bead formation than other weld beads in the bead formation portion; and forming the other weld beads overlying the supporting bead.

In this method for producing a built-up object, a supporting bead is formed in a portion where a gravitational influence is maximum and other weld beads are formed so as to overlie the supporting bead. Thus, the other weld beads can be formed using the formed supporting bead as a support. Consequently, the other weld beads can be inhibited from dripping by the influence of gravity, and it is possible to inhibit humping, which may occur if the travelling speed of the torch is increased in order to inhibit the dripping. Thus, a built-up object of high quality can be produced while attaining a reduced takt time.

(2) The method for producing a built-up object according to (1), in which the supporting bead is formed with a smaller heat input for melting the filler metal than the other weld beads.

In this method for producing a built-up object, the supporting bead has a high viscosity during the bead formation and is less affected by gravity. Consequently, even in a case where other weld beads are formed in the portion where a gravitational influence is maximum, the occurrence of dripping due to gravity is inhibited.

(3) The method for producing a built-up object according to (1) or (2), in which the bead formation portion is determined using a base-surface inclination angle and a track inclination angle as indexes of the gravitational influence, in which the base-surface inclination angle is an angle between the base surface on which the weld beads are to be formed and a vertical direction, in which the track inclination angle is an angle between a track direction of the torch in forming the weld beads and a vertical direction on the base surface.

In this method for producing a built-up object, the portion where a gravitational influence is maximum is determined from the base-surface inclination angle, at which the base surface is inclined with respect to the vertical plane, and from the track inclination angle, at which the track direction of the torch is inclined with respect to the vertical direction on the base surface, and a supporting bead can be accurately formed in the portion to produce a built-up object.

(4) The method for producing a built-up object according to (3), in which the indexes of the gravitational influence are determined from cos θ sin φ, in which θ is the base-surface inclination angle and φ is the track inclination angle.

In this method for producing a built-up object, since indexes of gravitational influence are determined from cos θ sin φ, a built-up object can be smoothly formed on the base surface having a base-surface inclination angle of θ and a track inclination angle of φ.

(5) The method for producing a built-up object according to (3) or (4), in which the built-up object includes deposited bead layers each including a plurality of the weld beads formed on/above the base surface, in which in a case where the base surface is inclined with respect to the vertical direction, the supporting bead is formed in a lower-end portion of the bead layers.

The supporting bead is formed in the lower-end portion of each layer where a gravitational influence is maximum, and other weld beads are formed along the base surface so as to be fixed by the supporting bead. Thus, a built-up object including a plurality of weld beads can be produced without dripping or humping.

(6) The method for producing a built-up object according to (5), in which in a case where the base surface is inclined with respect to the vertical direction, the supporting bead and the other weld beads in the bead layers are formed along a direction inclined with respect to the vertical direction at the track inclination angle.

Each layer is formed by forming the supporting bead in the lower-end portion where a gravitational influence is maximum and forming the other weld beads along the base surface such that the other weld beads are fixed by the supporting bead. Consequently, the other weld beads are supported by the supporting bead even when the other weld beads are deposited in an oblique direction in which dripping of the weld beads is likely to occur. It s hence possible to prevent bead dripping and humping.

(7) The method for producing a built-up object according to (6), in which the base surface is provided to a side surface of a base placed on a stage, in which the bead layers including the supporting beads and the other weld beads are deposited on the base in a lateral direction.

Since each layer is stably formed due to the formation of the supporting bead, layers of weld beads can be stacked in a lateral direction on the side surface of a base having an inclined base surface.

(8) An apparatus for producing a built-up object by melting and solidifying a filler metal to form weld beads and form the built-up object including the weld beads on a base surface, the apparatus including:

a torch configured to form the weld beads;

a moving mechanism configured to move the torch relatively to the base surface; and a control unit, in which the built-up object includes a bead formation portion where a gravitational influence is maximum, in which the control unit is configured to control the moving mechanism and the torch such that a supporting bead having a higher viscosity during weld-bead formation than other weld beads is formed in the bead formation portion and the other weld beads are formed so as to overlie the supporting bead.

With this apparatus for producing a built-up object, a supporting bead having a higher viscosity during the bead formation than other weld beads is formed in a portion where a gravitational influence is maximum. Thus, the other weld beads can be formed using the formed supporting bead as a support. Consequently, the other weld beads can be inhibited from dripping by the influence of gravity and it is possible to inhibit humping, which may occur if the travelling speed of the torch is increased in order to inhibit the dripping. Thus, a built-up object of high quality can be produced while a takt time is reduced.

(9) A built-up object including a plurality of deposited weld beads formed by melting and solidifying a filler metal, the built-up object including:

a bead formation portion where a gravitational influence is maximum;

a supporting bead formed in the bead formation portion, the supporting bead having a higher viscosity during weld-bead formation than other weld beads and the other weld beads formed so as to overlie the supporting bead.

This built-up object includes a supporting bead formed in a portion where a gravitational influence is maximum and further includes other weld beads formed so as to overlie the supporting bead. Consequently, the supporting bead serves as a support for the other weld beads to inhibit the other weld beads from dripping due to a gravitational influence, and shaping can be conducted without a trouble of humping due to the increase of the travelling speed of the torch for weld bead formation in order to inhibit dripping. Thus, a built-up object of high quality can be produced while a takt time for production is reduced.

This application is based on Japanese patent application filed on Nov. 15, 2017 (Application No. 2017-220214) and Japanese patent application filed on Jul. 26, 2018 (Application No. 2018-140711), the contents thereof being incorporated herein by reference.

REFERENCE SIGNS LIST

11 Additively manufacturing device (production device)
17 Torch
19 Welding robot (moving mechanism)
25 Weld bead
25A1, 25A2 Supporting beads
37 Control unit
51 Pedestal
52 Base
53 Base surface
54a, 54b, 54c, 54d Bead layers
M Filler metal
W Built-up object
θ Base-surface inclination angle
φ Track inclination angle

The invention claimed is:

1. A method for producing a built-up object by melting and solidifying a filler metal to form weld beads on a base surface along a track for a torch and form the built-up object formed by the weld beads,
wherein the built-up object includes a bead formation portion where a gravitational influence is maximum,
wherein the method comprises:
forming a supporting bead having a higher viscosity during weld-bead formation than other weld beads in the bead formation portion; and
forming the other weld beads overlying the supporting bead,
wherein the bead formation portion is determined using a base-surface inclination angle and a track inclination angle as indexes of the gravitational influence,
wherein the base-surface inclination angle is an angle between the base surface on which the weld beads are to be formed and a vertical direction, and
wherein the track inclination angle is an angle between a track direction of the torch in forming the weld beads and a vertical direction on the base surface.

2. The method for producing a built-up object according to claim 1, wherein the supporting bead is formed with a smaller heat input for melting the filler metal than the other weld beads.

3. The method for producing a built-up object according to claim 1,
wherein the built-up object includes deposited bead layers each including a plurality of the weld beads formed on/above the base surface,
wherein in a case where the base surface is inclined with respect to the vertical direction, the supporting bead is formed in a lower-end portion of the bead layers.

4. The method for producing a built-up object according to claim 3, wherein in a case where the base surface is inclined with respect to the vertical direction, the supporting bead and the other weld beads in the bead layers are formed along a direction inclined with respect to the vertical direction at the track inclination angle.

5. The method for producing a built-up object according to claim 4,
wherein the base surface is provided to a side surface of a base placed on a stage,
wherein the bead layers including the supporting beads and the other weld beads are deposited on the base in a lateral direction.

6. The method for producing a built-up object according to claim 1, wherein the indexes of the gravitational influence are determined from cos θ sin φ,
wherein θ is the base-surface inclination angle and y is the track inclination angle.

7. The method for producing a built-up object according to claim 6,
wherein the built-up object includes deposited bead layers each including a plurality of the weld beads formed on/above the base surface,
wherein in a case where the base surface is inclined with respect to the vertical direction, the supporting bead is formed in a lower-end portion of the bead layers.

8. The method for producing a built-up object according to claim 7, wherein in a case where the base surface is inclined with respect to the vertical direction, the supporting bead and the other weld beads in the bead layers are formed along a direction inclined with respect to the vertical direction at the track inclination angle.

9. The method for producing a built-up object according to claim 8,
wherein the base surface is provided to a side surface of a base placed on a stage,
wherein the bead layers including the supporting beads and the other weld beads are deposited on the base in a lateral direction.

10. An apparatus for producing a built-up object by melting and solidifying a filler metal to form weld beads and form the built-up object including the weld beads on a base surface, the apparatus comprising:
a torch configured to form the weld beads;
a moving mechanism configured to move the torch relatively to the base surface; and
a control unit,
wherein the built-up object includes a bead formation portion where a gravitational influence is maximum,
wherein the control unit is configured to control the moving mechanism and the torch such that a supporting bead having a higher viscosity during weld-bead formation than other weld beads is formed in the bead formation portion and the other weld beads are formed so as to overlie the supporting bead,
wherein the bead formation portion is determined using a base-surface inclination angle and a track inclination angle as indexes of the gravitational influence,
wherein the base-surface inclination angle is an angle between the base surface on which the weld beads are to be formed and a vertical direction, and
wherein the track inclination angle is an angle between a track direction of the torch in forming the weld beads and a vertical direction on the base surface.

* * * * *